UNITED STATES PATENT OFFICE.

JOHN HENRY, OF NEW YORK, N. Y.

IMPROVEMENT IN DEPILATING AND TANNING HIDES AND SKINS.

Specification forming part of Letters Patent No. 104,734, dated June 28, 1870.

*To all whom it may concern:*

Be it known that I, JOHN HENRY, of New York, in the county and State of New York, have invented a new and Improved Method of Tanning; and I do hereby declare that the following is a full and exact description thereof.

The nature of my invention consists in the following treatment of hides and skins.

To enable others skilled in the art of tanning to make and use my invention, I will proceed to describe the whole method of operation and the compositions used during the whole process.

After the hides are prepared for depilation by soaking and milling or breaking in a proper manner, I prepare the following composition:

In four barrels of water put five pounds of potash, ten pounds of lime, ten pounds salt, and one pound sulphur, half pound pulverized charcoal, having previously dissolved each article in water blood warm. The whole, which is sufficient for one hundred calf-skins, or an equivalent of hides, is then put into a revolving box, or a cylinder, or a wheel, such as is used for washing or tanning hides, together with the skins or hides to be depilated, and the box or wheel is made to revolve at the rate of twenty revolutions per minute.

What I claim is, that this composition is less injurious and more speedy in its action, and enables the hide or skin to tan more rapidly afterward than if lime alone had been used.

I also claim that the skin or hide is by the method above described brought in direct contact, as to its whole surface, with the composition, and that, being agitated and kneaded while in the composition, the process can be completed in twelve hours.

For tanning I make the following composition, viz:

I first make a liquor of bark-extract of 15° strength. To this I add equal proportions of catechu and sumac, each dissolved separately until the strength is increased to 30°. I then add five gallons of a strong decoction of wild or garden tansy, made by steaming the dried herb, five pounds of barley-flour, five pounds of pulverized alum, five pounds brown sugar, and one pound each of sugar of lead and ammonia, five pounds ground mustard-seed, one pint sulphuric acid, and ten pounds salt.

I use the composition named as follows, viz:

After the skins have been properly prepared by drenching, they are first put in liquor 5° in strength, made of equal proportions of bark extract, catechu, and sumac, and the grain is formed by an agitation of said liquor by means of a wheel. This generally requires from two to four hours. They are then drained and put into a tanning box, wheel, or cylinder, with a sufficient amount of the above-described tanning composition, and subjected to a slow rotary motion until completely tanned, which will be in twelve hours. The process will knead and pummel the skins or hides, and keep both them and the tanning material in constant motion.

What I claim in this is, that the ingredients used are of such nature and in such proportion as to rapidly act both upon the surface and interior of the skins or hides, and by a stimulating influence keep the pores constantly open, while other portions, being thus rapidly led into the center, thoroughly tan it, the whole composition producing full and solid flanks and shoulders and greater weight than usual.

I also claim that other ingredients counteract the effect of the gallic acid, and the leather will not break on the grain. It will also be made by still other ingredients of close fiber and fair color.

The chief claim of the whole process is gain in time, only ten days being required to convert raw hides or skins into leather, and ready for market.

The whole process combines simplicity and economy both in time and expense, and the leather produced will compare favorably, in the above-named qualities, with any made either in this or any other country.

What I claim as my invention, and desire to secure by Letters Patent, is—

1. The submission of the hides or skins while undergoing the process of depilation to such agitation and kneading in boxes or cylinders, substantially as described.

2. The composition above mentioned, for the purpose of depilation.

3. The tanning composition above described, substantially as set forth.

JOHN HENRY.

Witnesses:
R. P. WILSON,
JNO. D. PATTEN.